United States Patent [19]
Durham

[11] 3,899,932
[45] Aug. 19, 1975

[54] CHAIN RETENTION DEVICE FOR ELLIPTICAL SPROCKETS

[76] Inventor: Roger Owen Durham, 3944 Marathon St., Los Angeles, Calif. 90029

[22] Filed: Dec. 19, 1973

[21] Appl. No.: 425,991

[52] U.S. Cl. .............................. 74/243 NC; 74/437
[51] Int. Cl.² .................. F16H 55/30; F16H 55/04
[58] Field of Search ..................... 74/243 NC, 437

[56] References Cited
UNITED STATES PATENTS
1,142,051  6/1915  O'Connor...................... 74/243 NC
3,375,022  3/1968  Hattan........................ 74/243 NC X FOREIGN PATENTS OR APPLICATIONS
974,415  2/1951  France ......................... 74/243 NC

*Primary Examiner*—Leonard H. Gerin

[57] ABSTRACT

A chain retention device for elliptical sprockets for bicycles wherein the chain is retained by abnormally high teeth located along the flat sides where most derailment occurs. Tooth height is progressively reduced with teeth of normal height being located at the tips.

6 Claims, 2 Drawing Figures

CHAIN RETENTION DEVICE FOR ELLIPTICAL SPROCKETS

RELATED PATENTS

U.S. Pat. No. 3,375,022, March 26, 1968, by Hattan.

BACKGROUND OF THE INVENTION

This invention relates to a chain retention device for elliptical sprockets for bicycles.

An elliptical sprocket is oriented on a bicycle's crank so as to perform like a small sprocket when the crank points toward the cyclist's center of gravity and like a large sprocket after the crank has turned approximately 90° to a position wherein the cyclist is most effective, thus changing the rider's cadence and producing a more effective and even stroke.

In the past one of the problems with elliptical sprockets has been that of chain derailment, particularly when used with multiple sprockets at the rear wheel wherein the chain approaches the elliptical sprocket at some angle and must be deflected onto it. The chain comes off for two reasons.

At high crank speeds it comes off due to the development of excessive vertical whip. At low speeds a disturbance at the rear sprocket, either as a result of the rear wheel's hitting a bump in the roadway or from changing the chain from one rear sprocket to another, will create a wave in the chain which travels forward along its upper run and derails it when it reaches the elliptical sprocket.

Chain derailment of both types occurs along the flat sides of the sprockets rather than at their tips. At the tips the rapidly changing angle of the chain side-plates tends to anchor the chain to the sprocket.

Various guides and bevels of the sides of the teeth have been tried with some success, but chain derailment has continued to be one of the problems with elliptical sprockets which has prevented their universal adoption.

In the past the tooth configuration of elliptical sprockets has remained essentially the same as that for power transmission sprockets, with low, stubby teeth of uniform basic design for all teeth. The height of the teeth has been equal to or somewhat less than the diameter of the rollers of the chain.

The current invention teaches the use of teeth of greatly increased height along the flat sides of the sprocket, to keep the chain from going off. In particular the current invention teaches the use of teeth along the flat sides of a height equal to or exceeding 130% of the roller diameter of the chain.

SUMMARY OF THE INVENTION

According to the invention a chain retention device for elliptical sprockets reduces chain derailment by providing higher teeth along the flat sides of the sprocket. Tooth height is progressively reduced to normal at the tips to allow free engagement and disengagement of the chain at these sectors.

The chain engages and disengages in a normal manner, being unaffected by the elongated teeth along the flat sides. Once seated, however, the higher teeth along the flat sides enmesh the chain and prevent its derailment.

DETAILED DESCRIPTION OF THE DRAWINGS

Figure 1:
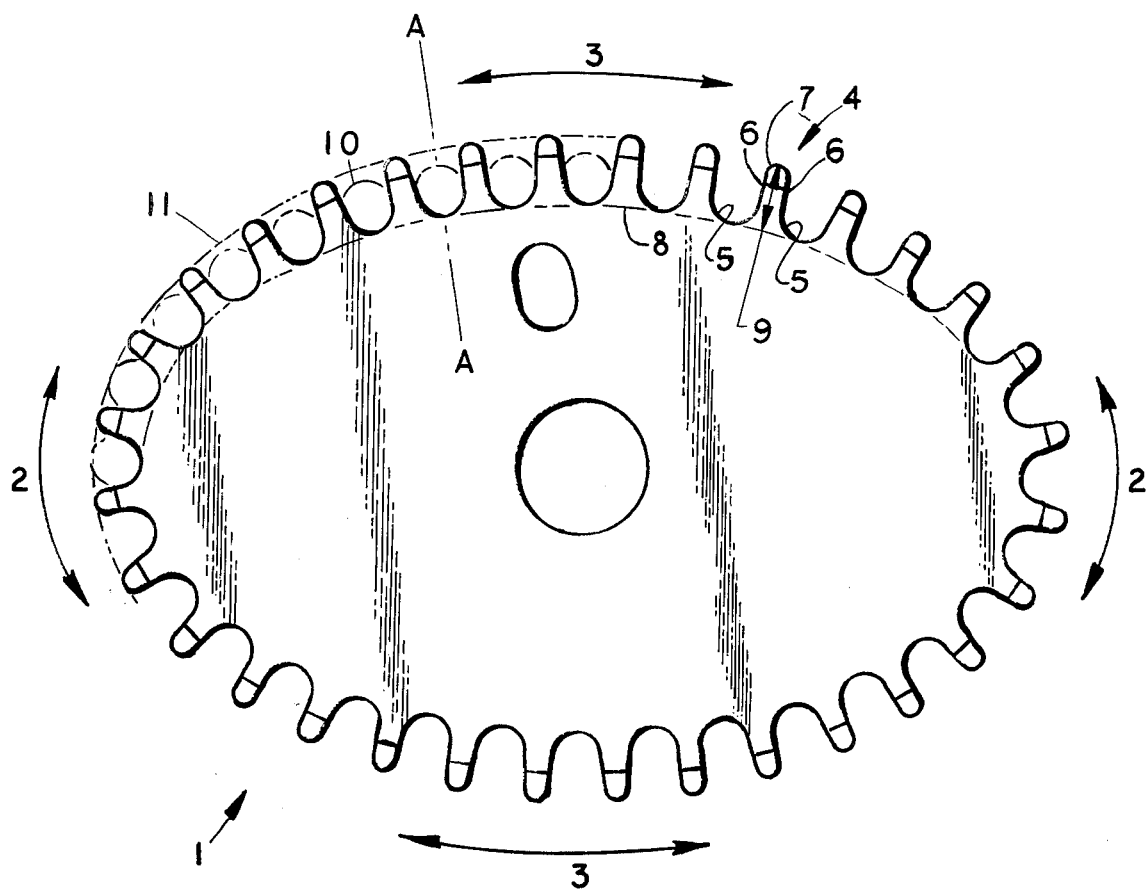
FIG. 1 shows the side view of a small elliptical sprocket embodying the chain retention device of this invention.
Figure 2:
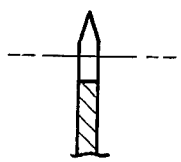
FIG. 2 is a section through the sprocket taken along line A—A of FIG. 1 and shows the beveled flanks of a tooth.

Referring to FIG. 1, an elliptical sprocket 1 has a pair of oppositely disposed tips 2 and corresponding flat sides 3. A typical sprocket tooth 4 has roller seats 5, tooth faces 6, and a rounded tooth end 7. A base curve 8 is shown in phantom to connect the low points of said roller seats 5. The tooth height 9 for any particular tooth 4 is thus the distance between said base curve 8 and said tooth end 7, measured at the center of said tooth 4. Also in phantom are shown several chain rollers 10, of a chain compatible with said elliptical sprocket 1, said chain rollers being shown seated on said roller seats 5. A tip curve 11, also shown in phantom, is drawn to connect the rounded tooth ends 7, and serves to illustrate the increase in said tooth height 9 from that at said tips 2, where it is approximately equal to the diameter of said chain roller 10, to that at the flat sides 3, where it is shown to be considerably higher than the diameter of said chain roller 10.

Where for the sake of clarity the sprocket 1 has been referred to as 'elliptical' it will be understood that the chain retention device of this invention would be equally applicable to any similar non-round sprocket, which could be nearly elliptical in shape, oblong, or even diamond shaped with radiused corners.

The higher teeth along said flat sides 3 do not interfere with the engagement or disengagement of the roller chain, nor do the teeth of normal height located at said tips 2, However, if the higher teeth were located at said tips 2, interference between such higher teeth and the roller chain would surely result, preventing engagement or disengagement.

The higher teeth located along said flat sides 3 are of sufficient height to prevent derailment of the roller chain. Tooth height in excess of 130% of the diameter of said roller 10 is illustrated.

Thus a very simple chain retention device for elliptical sprockets is provided which keeps the chain from being derailed without interfering with its normal engagement and disengagement.

I claim:

1. A non-round sprocket having tips and flat sides wherein the teeth along the flat sides are of greater height than those at the tips.

2. Apparatus according to claim 1 wherein said non-round sprocket is approximately elliptical in shape.

3. A non-round sprocket having tips and flat sides with teeth which vary progressively in height from the lowest, located at the tips, to the highest, located along the flat sides.

4. Apparatus according to claim 3 wherein said non-round sprocket is approximately elliptical in shape.

5. An elliptical sprocket having elongated teeth on its flat sides and shorter teeth at its tips.

6. An elliptical sprocket having teeth on its flat sides of a height equal to or greater than 130% of the roller diameter of a chain compatible with said elliptical sprocket.

* * * * *